(12) United States Patent
Dontcheva et al.

(10) Patent No.: US 10,896,161 B2
(45) Date of Patent: Jan. 19, 2021

(54) INTEGRATED COMPUTING ENVIRONMENT FOR MANAGING AND PRESENTING DESIGN ITERATIONS

(71) Applicant: Adobe Inc., San Jose, CA (US)

(72) Inventors: Lubomira A. Dontcheva, Seattle, WA (US); Wilmot Li, Seattle, WA (US); Morgan Dixon, Seattle, WA (US); Jasper O'Leary, Seattle, WA (US); Holger Winnemoeller, Seattle, WA (US)

(73) Assignee: ADOBE INC., San Jose, CA (US)

( * ) Notice: Subject to any disclaimer, the term of this patent is extended or adjusted under 35 U.S.C. 154(b) by 369 days.

(21) Appl. No.: 15/908,079

(22) Filed: Feb. 28, 2018

(65) Prior Publication Data
US 2019/0266265 A1 Aug. 29, 2019

(51) Int. Cl.
*G06F 3/0484* (2013.01)
*G06F 3/0482* (2013.01)
*G06F 40/169* (2020.01)
*G06F 16/21* (2019.01)

(52) U.S. Cl.
CPC .......... *G06F 16/219* (2019.01); *G06F 3/0482* (2013.01); *G06F 3/0484* (2013.01); *G06F 40/169* (2020.01)

(58) Field of Classification Search
CPC .... G06F 16/219; G06F 16/287; G06F 3/0482; G06F 3/04842; G06F 3/04845; G06F 3/0484; G06F 40/169
USPC ................................................. 707/694, 695
See application file for complete search history.

(56) References Cited

U.S. PATENT DOCUMENTS

2008/0046218 A1* 2/2008 Dontcheva .............. G06F 11/32
                                                      702/186
2012/0284197 A1* 11/2012 Sitrick ............... G06Q 10/0631
                                                      705/301

OTHER PUBLICATIONS

Bernstein, Michael S., et al., "Crowds in Two Seconds: Enabling Realtime Crowd-powered Interfaces", Proceedings of the 24th Annual ACM Symposium on User Interface Software and Technology (UIST '11). 2011, ACM, New York, NY, USA, 33-42. DOI: http://dx.doi.org/10.1145/2047196.2047201.

(Continued)

*Primary Examiner* — Robert W Beausoliel, Jr.
*Assistant Examiner* — Pedro J Santos
(74) *Attorney, Agent, or Firm* — F. Chau & Associates, LLC

(57) ABSTRACT

Techniques of managing design iterations include generating data linking selected snapshot histories with contextual notes within a single presentation environment. A designer may generate a design iteration in a design environment. Once the design iteration is complete, the designer may show a snapshot of the design iteration to a stakeholder. The stakeholder then may provide written contextual notes within the design environment. The computer links the contextual notes to the snapshot and stores the snapshot and contextual notes in a database. When the designer generates a new design iteration from the previous design iteration and the contextual notes, the computer generates a new snapshot and a link to the previous snapshot to form a timeline of snapshots. The designer may then present the snapshots, the timeline, and the contextual notes to the stakeholder as a coherent history of how the design of the mobile app evolved to its present state.

19 Claims, 6 Drawing Sheets

(56) References Cited

OTHER PUBLICATIONS

Chen, Hsiang-Ting, et al., "Data-driven Adaptive History for Image Editing", Proceedings of the 20th ACM, SIGGRAPH Symposium on Interactive 3D Graphics and Games, 2016, pp. 103-111.
Dow, Steven P., et al., "Parallel Prototyping Leads to Better Design Results, More Divergence, and Increased Self-efficacy", ACM Transactions on Computer-Human Interaction, vol. 17, No. 4, Dec. 2010, pp. 18:1-18:24.
Foong, Eureka, et al., "Online Feedback Exchange: A Framework for Understanding the Socio-Psychological Factors", Proceedings of CHI Conference on Human Factors in Computing Systems, 2017, pp. 4454-4467.
Gerber, Elizabeth, et al., "The Psychological Experience of Prototyping", Design Studies, vol. 33, No. 1, Jan. 2012, 21 pages.
Greever, Tom, "Articulating Design Decisions: Communicate with Stakeholders, Keep Your Sanity, and Deliver the Best User Experience", O'Reilly Media, Inc., 2015, 278 pages.
Grossman, Tovi, et al., "Chronicle: Capture, Exploration, and Playback of Document Workflow Histories", Proceedings of 23rd Annual ACM Symposium on User Interface Software and Technology, 2010, pp. 143-152.
Hartmann, Björn, et al. "d.Note: Revising User Interfaces Through Change Tracking, Annotations, and Alternatives", Proceedings of the SIGCHI Conference on Human Factors in Computing Systems, Apr. 10-15, 2010, pp. 493-502.
Heer, Jeffrey, "Voyagers and Voyeurs: Supporting Asynchronous Collaborative Information Visualization", Proceedings of the SIGCHI Conference on Human Factors in Computing Systems, 2007, pp. 1029-1038.
Henderson, Kathryn, "Flexible Sketches and Inflexible Data Bases: Visual Communication, Conscription Devices, and Boundary Objects in Design Engineering", Science, Technology, & Human Values, vol. 16, No. 4, 1991, pp. 448-473.
Shii, Hiroshi, et al., "ClearBoard: A Seamless Medium for Shared Drawing and Conversation with Eye Contact", Proceedings of SIGCHI Conference on Human Factors in Computing Systems, May 3-7, 1992, pp. 525-532.
Jung, Young-Wook, et al., "Possibilities and Limitations of Online Document Tools for Design Collaboration: The Case of Google Docs", Proceedings of ACM Conference on Computer Supported Cooperative Work and Social Computing, Feb. 25-Mar. 1, 2017, pp. 1096-1108.
Kim, Joy, et al., "Mosaic: Designing Online Creative Communities for Sharing Works-in-Progress", In Proceedings of the 2017 ACM Conference on Computer Supported Cooperative Work and Social Computing (CSCW '17), Feb. 25-Mar. 1, 2017, ACM, New York, NY, USA, pp. 246-258.
Klemmer, Scott R., et al., "Where Do Web Sites Come From? Capturing and Interacting with Design History", Proceedings of SIGCHI Conference on Human Factors in Computing Systems, Apr. 20-25, 2002, pp. 1-8.
Lee, Charlotte P., "Boundary Negotiating Artifacts: Unbinding the Routine of Boundary Objects and Embracing Chaos in Collaborative Work", Computer Supported Cooperative Work, vol. 16, Issue 3, Jun. 2007, pp. 307-339.
Lehni, Juerg, et al., "Paper.js", available online at <http://designenvy.aiga.org/paper-js-juerg-lehni-and-jonathan-puckey/>, 2011, 3 pages.
Linder, Rhema, et al., "Everyday Ideation: All of My Ideas Are on Pinterest", Proceedings of the SIGCHI Conference on Human Factors in Computing Systems, 2014, pp. 2411-2420.
Luther, Kurt, et al., "CrowdCrit: Crowdsourcing and Aggregating Visual Design Critique", Proceedings of the Companion Publication of the 17th ACM Conference on Computer Supported Cooperative Work & Social Computing, Feb. 15-19, 2014, pp. 21-24.
Marlow, Jennifer, et al., "Beyond Talking Heads: Multimedia Artifact Creation, Use, and Sharing in Distributed Meetings", In Proceedings of the 19th ACM Conference on Computer-Supported Cooperative Work & Social Computing, Feb. 27-Mar. 2, 2016, pp. 1703-1715.
Oehlberg, Lora, et al., "Showing is Sharing: Building Shared Understanding in Human-centered Design Teams with Dazzle", Proceedings of the Designing Interactive Systems Conference, Jun. 11-15, 2012, pp. 669-678.
Pavel, Amy, "VidCrit: Video-based Asynchronous Video Review", Proceedings of the 29th Annual Symposium on User Interface Software and Technology, Oct. 16-19, 2016, pp. 517-528.
Retelny, Daniela, et al., "Embedding Intentions in Drawings: How Architects Craft and Curate Drawings to Achieve Their Goals", Proceedings of the 19th ACM Conference on Computer-Supported Cooperative Work & Social Computing, Feb. 27-Mar. 2, 2016, pp. 1310-1322.
Su, Sara L., et al., "Interactive Visual Histories for Vector Graphics", Computer Science and Artificial Intelligence Laboratory Technical Report, Jun. 24, 2009, pp. 1-12.
Terry, Michael, et al., "Recognizing Creative Needs in User Interface Design", Proceedings of the 4th conference on Creativity & Cognition, Oct. 14-16, 2002, pp. 38-44.
Wittenhagen, Moritz, et al., "Chronicler: Interactive Exploration of Source Code History", Proceedings of the CHI Conference on Human Factors in Computing Systems, May 7-12, 2016, pp. 3522-3532.
Xu, Anbang, et al., "Voyant: Generating Structured Feedback on Visual Designs Using a Crowd of Non-experts", Proceedings of the 17th ACM Conference on Computer Supported Cooperative Work & Social Computing, Feb. 15-19, 2014, pp. 1433-1444.
Yoon, Dongwook, et al., "RichReview: Blending Ink, Speech, and Gesture to Support Collaborative Document Review", Proceedings of 27th Annual ACM Symposium on User Interface Software and Technology, Oct. 5-8, 2014, pp. 481-490.
Zaman, Loutfouz, et al., "GEM-NI: A System for Creating and Managing Alternatives in Generative Design", Proceedings of the 33rd Annual ACM Conference on Human Factors in Computing Systems, 2015, pp. 1201-1210.

* cited by examiner

INTEGRATED COMPUTING ENVIRONMENT FOR MANAGING AND PRESENTING DESIGN ITERATIONS

TECHNICAL FIELD

This description relates to managing design iterations and feedback on those iterations.

BACKGROUND

Some designers of creative content generate such content iteratively based on feedback from colleagues, clients, and other shareholders. In conventional approaches to managing design iterations, content designers store histories of their design iterations in a file that may be reviewed during the design process. For example, designers of mobile app user interfaces (UIs) may save previous design iterations in a presentation file such as a Microsoft® Powerpoint® file. In this way, a designer may communicate the evolution of a UI design to colleagues in order to educate the colleagues on the design process and make subsequent design iterations based on a better appreciation of the previous designs.

SUMMARY

In one general aspect, a method can include receiving, by processing circuitry of a computer configured to store and display iterations of content data, first snapshot data representing a first snapshot of first content, the first snapshot data including (i) first artboard identification data identifying a first set of artboards, each of the first set of artboards including portions of the first content and (ii) contextual note data representing a set of contextual notes, the set of contextual notes representing comments concerning the first set of artboards. The method can also include acquiring, by the processing circuitry, second snapshot data representing a second snapshot of second content, the second snapshot data including second artboard identification data identifying a second set of artboards, each of the second set of artboards including sections of the second content. The method can further include generating, by the processing circuitry, snapshot link data indicating that the second snapshot follows from the first snapshot, the snapshot link data being included in the second snapshot data, the snapshot link data including pointer data representing an address in physical storage of the first content data. The method can further include displaying, by the processing circuitry and on a display device, a first graphic representing the first set of artboards, a second graphic representing the second set of artboards, a third graphic representing a history based on the snapshot link data, and a set of annotations to the first graphic corresponding to the set of contextual notes, the history indicating that the second snapshot follows from the first snapshot.

The details of one or more implementations are set forth in the accompanying drawings and the description below. Other features will be apparent from the description and drawings, and from the claims.

DETAILED DESCRIPTION

Figure 1:
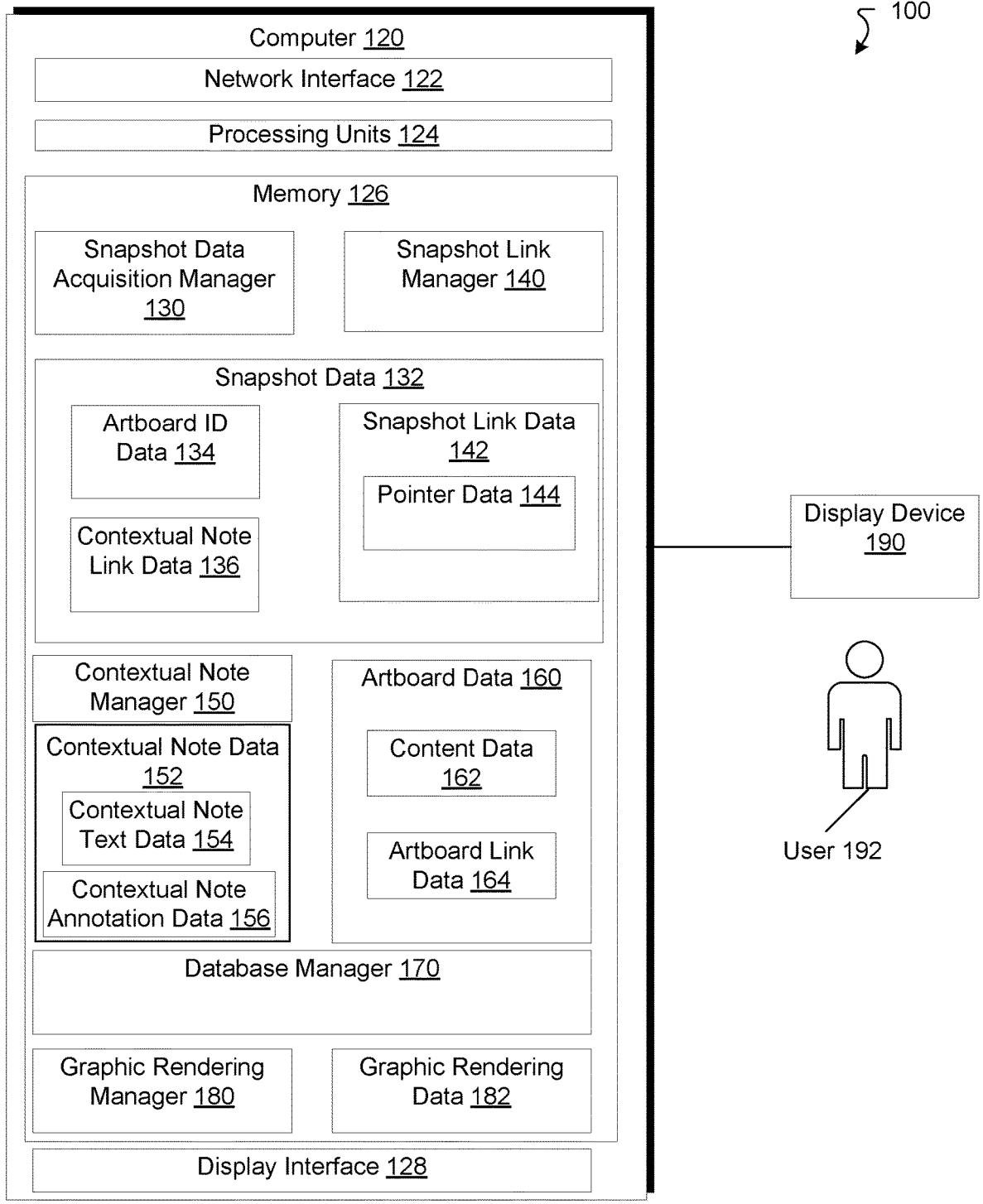
FIG. 1 is a diagram that illustrates an example electronic environment in which improved techniques described herein may be implemented.

The above-described conventional approaches to designing content may be burdensome and labor-intensive for content designers. Along these lines, using the conventional approaches, designers manually keep track of all design iterations and the feedback associated with each iteration. For example, during a review of a design iteration, a designer may take notes about the feedback being received from shareholders. This review may take the form of handwritten text in sticky notes and notepads. Such notes about feedback are difficult to associate with each respective design iteration and are not searchable.

Moreover, the act of selecting specific design iterations for presentation to shareholders may also add additional burden to the design process. Along these lines, some designers make several presentations at the same design iteration based on which shareholder is receiving a presentation. For example, a designer may make a first presentation for a colleague that shows all design iterations and a second presentation for a client that omits some of the design iterations. Accordingly, presenting a history of design revisions that lead to a current design iteration can add a lot of time and labor to the design process.

Some design tools exist that allow designers to associate textual comments and visual annotations with a specific design iteration. Nevertheless, no such tool exists that allows for such associations to be made over a history of design iterations. Moreover, no such tool exists that allow a designer to include annotations within a design environment. Rather, such annotations are made on copies of a design outside of the design environment.

In accordance with the implementations described herein and in contrast to the above-described conventional approaches to managing design iterations, improved techniques include generating data that links selected snapshot histories with contextual notes within a single presentation environment. For example, a designer may create a user interface for a mobile app. An iteration of the design may include a number of screenshots, each representing a possible window that is seen by a user. The designer may generate a design iteration in a design environment such as Adobe® XD that runs on a computer. Once the design iteration is complete, the designer may show a snapshot, or at least a portion of the design iteration to a stakeholder, e.g., a manager, a client, or a colleague, on a display. The stakeholder then may provide written contextual notes in the design environment on the display. The computer links the contextual notes to the snapshot and stores the snapshot and contextual notes in a database. The designer generates a new design iteration based on the previous design iteration and the contextual notes, and then curates or selects content that are important to that design iteration. Once the designer chooses to create a new snapshot, the computer generates a new snapshot and a link to a previous snapshot to form a timeline of snapshots. The designer may then present the snapshots, the timeline, and the contextual notes to the stakeholder as a single, coherent history of how the design of the mobile app evolved to its present state.

Advantageously, such a presentation environment allows a designer to present customized historical snapshots of a design and the feedback that influenced those snapshots in a single design environment in which those snapshots were created. This is in contrast to the above-described conventional approaches to managing design iterations in which a designer might generate a design in one application, present the design in another application, and store the designs and notes from feedback in an ad-hoc manner. Further, the improved techniques as described above includes automatically generating snapshot link data indicating a hierarchal order of snapshot iterations. As opposed to the conventional approaches, a designer does not need to manually organize design iterations to generate a history of the design. Rather, using the improved techniques, a computer automatically arranges such a history for the designer, thus making the design process faster and less error-prone.

In some implementations, a computer can, on the display device within the application window, include a fourth graphic that includes a textual representation of the contextual note data. In some implementations, the computer also receives data indicating a selection of a textual representation of a contextual note of the set of contextual notes. In this case, the computer may perform a highlighting operation on the set of annotations to highlight the annotation corresponding to the contextual note relative to other annotations of the set of annotations.

In some implementations, receiving the first content data and the contextual note data includes generating a first content data file, generating a contextual note data file separate from the first content data file, and generating, as the contextual note data of the first snapshot data, contextual note link data including pointer data representing an address in physical storage of the contextual note data file.

In some implementations, generating the snapshot link data indicating that the second snapshot follows the first snapshot in time includes receiving copy/paste data representing a history and copy commands and paste commands within the application window; and producing the snapshot link data based on the copy/paste data.

In some implementations, the computer can receive the second content data in a session synchronous with the receiving of the contextual note data.

In some implementations, the first content and the second content include one or more of graphic data and audio data.

In some implementations, generating the snapshot link data indicating that the second snapshot follows the first snapshot in time includes generating, as snapshot link data included in the first snapshot data, pointer data representing an address in physical storage of the second content data.

In some implementations, receiving the first snapshot data includes obtaining artboard selection data selecting at least one artboard from an initial set of artboards; and identifying, as the set of artboards selected by the first snapshot, the at least one artboard selected by the artboard identification data. In some implementations, the initial set of artboards is stored as a database file in a database. In this case, obtaining the artboard selection data selecting at least one artboard from an initial set of artboards includes receiving a database query identifying portions of the database file that includes the at least one artboard. In some implementations, the database is a NoSQL database.

The following definitions are used for clarity in the discussion hereinafter. "Content" refers to any graphic, video, audio, or other form of expression that is encapsulated in data that may be stored and processed by a computer. Content may be edited at various times, in response to comments or otherwise, and accordingly may have versions, or "iterations". An "artboard" is a portion of an iteration of the content. "Contextual notes" are representations of feedback as text and/or annotations to artboards. A "snapshot" is a data object corresponding to an iteration of the content that includes, for that iteration, addresses in storage for a set of artboards and corresponding contextual notes, as well as "links" (i.e., addresses in a database or physical storage) to "parent" and "child" snapshots corresponding to previous or subsequent iteration of the content.

FIG. 1 is a diagram that illustrates an example electronic environment 100 in which the above-described improved techniques may be implemented. As shown, in FIG. 1, the electronic environment 100 includes a computer 120 and a display device 190 viewed by a user 192.

The computer 120 is configured to display user-specified drawings on a display device. The computer 120 includes a network interface 122, one or more processing units 124, memory 126, and a display interface 128. The network interface 122 includes, for example, Ethernet adaptors, Token Ring adaptors, and the like, for converting electronic and/or optical signals received from a network to electronic form for use by the editing computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the computer 120 can be, or can include processors (e.g., processing units 124) configured to process instructions stored in the memory 126. Examples of such instructions as depicted in FIG. 1 include a snapshot data acquisition manager 130, a snapshot link manager 140, a contextual note manager 150, a database manager 170, and a graphic rendering manager 180. Further, as illustrated in FIG. 1, the memory 126 is configured to store various data, which is described with respect to the respective managers that use such data.

The snapshot data acquisition manager 130 is configured to acquire, e.g., receive and/or generate, snapshot data 132. In one example, when a designer wishes to present a previous iteration of content, the snapshot data acquisition manager 130 is configured to receive a previous iteration of the snapshot data 132 via, e.g., a storage disk. In another example, when the designer creates a new iteration of the content, the snapshot data acquisition manager 130 is configured to generate a child iteration of the snapshot data 132 to be stored in the database and/or storage disk.

The snapshot data 132 represents a snapshot corresponding to an iteration of the content that includes, for that iteration, addresses in storage for a set of artboards, i.e., artboard identification data 134, and corresponding contextual note link data 136. In some implementations, the snapshot data 132 is an object in a database. In some implementations, the database is a NoSQL database such as MongoDB. In some implementations, the snapshot data 132 is represented in a structured data format such as, e.g., JSON, XML, or the like.

In some implementations, the artboard identification data 134 includes a set of addresses at which portions of content, or artboard data 160, that identify an artboard. Such an artboard includes an iteration of the content being created by the designer. For example, when a designer creates a user interface for a mobile application, an artboard may include content defining a screenshot of the user interface. In some implementations, the set of addresses of the artboard identification data 134 correspond to a location in a database. In some implementations, the set of addresses of the artboard identification data 134 correspond to a location in a storage disk.

The contextual note link data 136 includes identifiers or addresses of contextual note data 152 corresponding to the snapshot data 132. In some implementations, the contextual note data corresponds to particular artboards identified by the artboard identification data 134. In some implementations, the contextual note data includes an indication of whether the contextual note encapsulated in the contextual note data includes a graphic annotation to an artboard as rendered on the display device 190.

The snapshot link manager 140 is configured to generate snapshot link data 142 in response to a generation, or acquisition, of a snapshot of a new iteration of the content. For example, a designer may cause the snapshot data acquisition manager 130 to generate a new snapshot when artboards identified by an existing snapshot, e.g., snapshot data 132, are copied and pasted in a browser window displayed in the display device 190. Upon generation of that new snapshot, the snapshot link manager 140 creates, as the snapshot link data 142, data indicating that the previous snapshot is a parent of the previous snapshot. In some implementations, the snapshot link manager 140 generates, in a new snapshot data object corresponding to the new snapshot, data indicating that the new snapshot is a child of the previous snapshot. In some implementations, the snapshot link manager 140 generates the snapshot link data 142 based on the designer's copy/paste behavior; this behavior is discussed in detail with regard to FIGS. 4 and 5.

As illustrated in FIG. 1, the snapshot link data 142 is included in the snapshot data 132 and includes pointer data 144 that represents the addresses in a database or a storage disk of child and parent snapshots. In some implementations, the snapshot link data 142 is separate from the snapshot data 132.

The contextual note manager 150 is configured to generate contextual note data 152 based on feedback corresponding to artboards identified by a snapshot. In some implementations, when the feedback includes an annotation to an artboard added by a user, e.g., a stakeholder in the development of the content, the contextual note manager 150 is configured to generate a textual representation of the feedback and store the textual representation in a file. In some implementations, the file is a database file separate from a database file for the snapshot data 132. In some implementations, the contextual note manager 150, in addition to or instead of the snapshot data acquisition manager 130 or the snapshot link manager 140, is configured to generate links, e.g., contextual note link data 136 between contextual note data 152 and corresponding snapshot data 132 within the snapshot data 132.

The contextual note data 152 represents feedback to a snapshot provided by users, e.g., stakeholders upon which a child snapshot may be generated. The contextual note data 152 includes contextual note text data 154 and contextual note annotation data 156.

The contextual note text data 154 encapsulates a textual representation of the feedback. The contextual note manager 150 is configured to receive, as the contextual note text data 154, textual comments as the feedback. In some implementations, such comments may be typed in by a stakeholder or by the designer as the designer takes notes while listening to the stakeholder. In some implementations, such comments may be derived from graphical annotations represented by the contextual note annotation data 156. For example, the contextual note manager 150 may be configured to perform an optical character recognition operation on a graphical annotation to produce a textual comment.

The contextual note annotation data 156 encapsulates a graphical representation of the feedback. The contextual note manager 150 is configured to receive, as the contextual note annotation data 156, graphical annotations to a snapshot as rendered on the display device 190 as the feedback. In one example, the contextual note annotation data 156 may include handwritten notes overlaid onto or drawn adjacent to an artboard rendered on the display device 190. In another example, the contextual note annotation data 156 may include hand-drawn symbols such as circles or lines highlighting portions of an artboard or artboards rendered on the display device 190. In some implementations, the contextual note annotation data 156 also includes location data indicating a location with respect to a snapshot or an artboard shown in the display device 190 where an annotation graphic is placed.

The artboard data 160 includes portions of iterations of content information that may be displayed on the display device 190. The artboard data 160 includes both content data 162 and artboard link data 164.

As discussed previously, the content data 162 encapsulates a portion of the content used in each snapshot iteration. For example, when the content is a design of a user interface for a mobile app, an artboard may be a screenshot of the user interface. The content data 162 may be expressed in any standard format, e.g., a JPEG file, a PNG file, and the like. In some implementations, the content data 162 may include audio data and/or video data. Such data may also be expressed in standard formats such as MP3, MPEG-4, H.264, and the like. In some implementations, the content data 162 is in the form of a scene graph which is rendered by the graphic rendering manager 180, allowing a designer to modify the content data 162 within a design environment such as Adobe® XD.

The artboard link data 164 is generated by the snapshot data acquisition manager 130 and/or the snapshot link manager 140 and includes addresses at which a snapshot to which the content data 162, i.e., an iteration of the content, is stored. In some implementations, the artboard link data 164 includes an address within a database. In some implementations, the artboard link data 164 includes an address in a storage disk.

The database manager 170 is configured to receive database queries and produce snapshot data, e.g., snapshot data 132, in response to the database queries. For example, when the database used to organize iterations of snapshots is MongoDB, then such a query may be made by name. Specifically, a MongoDB object may take the form

```
db.snapshots.findOne({name: "Second"})
{
    "_id" : "7Buth3rAiSKkLhGxz",
    "name" : "Second",
    "parentSnapshotId" : "nHZhbeqoPuBc8dBP2",
    "childSnapshotId" : "reS5bWet2KqakycrN",
    "artboardIds" : [
        "bed38dbe-dc24-428d-b471-3fbd982c9d56",
        "f6d10665-b2fb-476b-9476-61e165c0913c",
        "c1a95ef2-b98e-4863-88af-396d0da19c67",
        "0328bdb6-8a5f-4b93-9348-87b2a3d19542",
        "d11ab4d7-0a3b-415d-b7f8-f7c134c5f31b",
        "0c2a1e12-0eb2-495a-81d7-1cd1a22fb185",
        "0ec5f5bd-a3de-40a7-a665-6a53c1b458e1",
        "5f5f574b-8ff1-4222-a4e9-da2194cda5f0",
        "591ef311-e121-4c66-9b9d-15d099e59db9"
    ],
    "overlayBoxAnnotationIds" : [ ],
    "pencilScribbleAnnotationIds" : [ ],
    "textBoxAnnotationIds" : [ ]
}
```

In this case, the snapshot object has the following fields: an "id" field identifying the snapshot, a "name" field whose value is a string which a user may refer to the snapshot object, a "parentSnapshotId" field whose value is an identifier of the parent snapshot, a "childSnapshotId" field whose value is an identifier of the child snapshot, "artboardIds" whose values are identifiers of artboards in the database, and "overlayBoxAnnotationIds", "pencilScribbleAnnotationIds", and "textBoxAnnotationIds" are identifiers of various contextual note data in the database. Note that the parentSnapshotId and childSnapshotId fields have values that represent the pointer data 144 of the snapshot link data 142. A MongoDB query of the form that is configured to produce a parent db.snapshots.findOne({name: "Second"}).parentSnapshotId produces the following output: nHZhbeqoPuBc8dBP2, which is the identifier of the parent snapshot.

The graphic rendering manager 180 is configured to generate graphic rendering data 182 based on the snapshot data 132, contextual note data 152, and artboard data 160. The graphic rendering manager 180 is further configured to transmit the graphic rendering data 182 over the display interface 128 for display on the display device 190. Further details of the graphic rendering data 182 as displayed on the display device 190 are discussed with reference to FIG. 2.

The components (e.g., modules, processing units 124) of the computer 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1.

In some embodiments, one or more of the components of the computer 120 can be, or can include, processors configured to process instructions stored in a memory. For example, an snapshot data acquisition manager 130 (and/or a portion thereof), a snapshot link manager 140 (and/or a portion thereof), a contextual note manager 150 (and/or a portion thereof), a database manager 170 (and/or a portion thereof), and a graphic rendering manager 180 (and/or a portion thereof) can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the editing computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the editing computer 120. As illustrated in FIG. 1, the memory 126 is configured to store various data, including snapshot data 132, artboard data 160, and graphic rendering data 182.

Figure 2A:
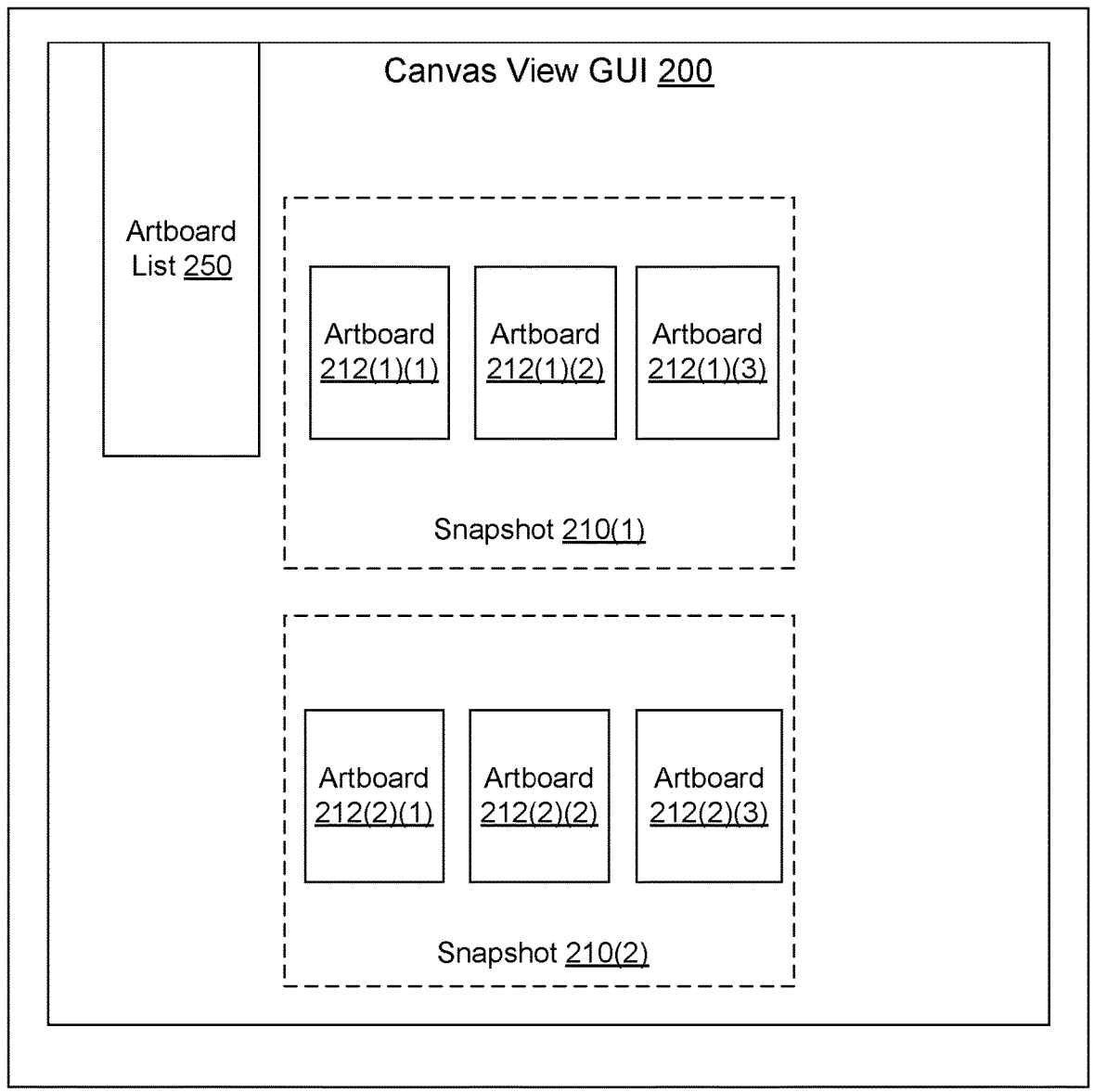
FIG. 2A is a diagram that illustrates an example graphical user interface displayed on a display device within the electronic environment shown in FIG. 1.

FIG. 2A illustrates an example canvas view graphical user interface (GUI) 200 within a window on the display 190. As shown in FIG. 2A, the GUI 200 includes graphical representations of a parent snapshot 210(1), a child snapshot 210(2), and an artboard list 270. This example GUI 200 illustrates a case in which a parent snapshot 210(1) has been loaded in the display 190 and the child snapshot 210(2) has been generated based on feedback for the parent snapshot 210(1). In FIG. 2, the boxes bounded by dashed lines illustrate a region that is not visible in the GUI 200 and is there for illustration purposes.

Each of the snapshots 210(1) and 210(2) include respective artboards 212(1)(1-3) and 212(2)(1-3). For example, if the design content is a user interface for a mobile app, then each of the artboards 212(1), 212(2), and 212(3) represents a screenshot of the mobile app. Specifically, suppose that the mobile app supports a retail operation. The content of artboard 212(1) forms a homescreen with a login, that of artboard 212(2) forms a product page that displays graphics of various products for selection by the user, and that of artboard 212(3) forms a checkout page in which a user inputs payment information to pay for the products selected.

The artboard list 270 is a graphic list of all artboards of a snapshot file. In some implementations, the artboard list 270 is a graphic list of all artboards shown in the GUI 200. In some implementations, each element of the list 270 is a thumbnail graphic representing a respective artboard. In some implementations, each element of the list 270 is a textual reference to a respective artboard. In some implementations, each element of the list 270 may perform an action upon detecting a user action, e.g., a mouse click within its boundaries. An example of such an action is highlighting the artboard that was clicked in the list 270.

Figure 2B:
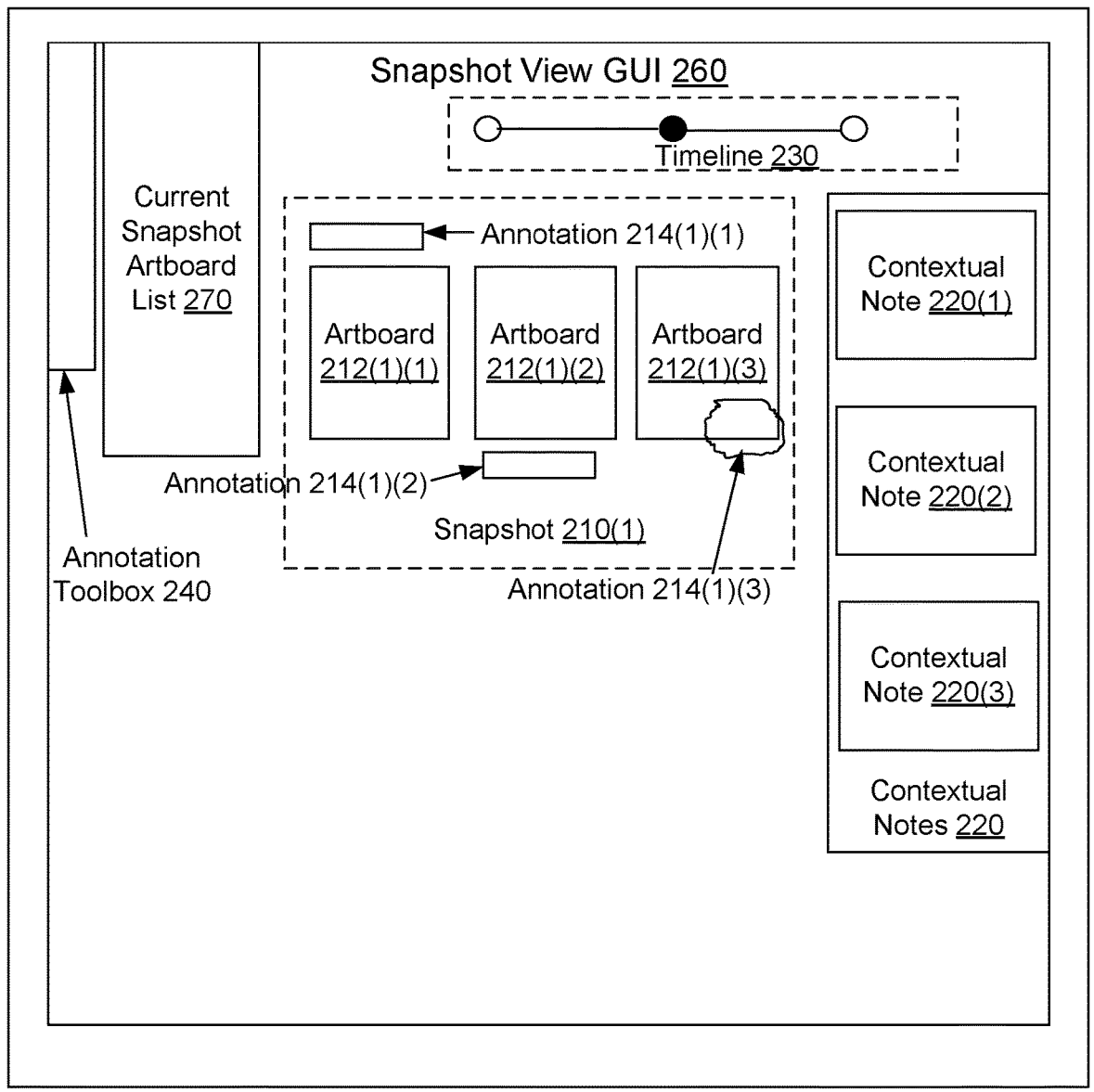
FIG. 2B is a diagram that illustrates another example graphical user interface displayed on a display device within the electronic environment shown in FIG. 1.

FIG. 2B illustrates an example snapshot view graphical user interface (GUI) 260 within a window on the display 190. As shown in FIG. 2B, the GUI 260 includes the graphical representations of the parent snapshot 210(1), contextual notes 220, a timeline 230, an annotation toolbox 240, and a current snapshot artboard list 250.

The feedback associated with the parent snapshot 210(1) is expressed in the GUI 260 in two different ways. First, on or adjacent to each of the artboards 212(1)(1), 212(1)(2), and 212(1)(3) is a respective annotation graphic 214(1)(1), 214(1)(2), 214(1)(3). For example, the annotation 214(1)(1) is a scribble stating a suggestion to change the font on the home page. The annotation 214(1)(2) is another scribble stating that the background should be eggshell rather than white. The annotation 214(1)(3) is a hand-drawn circle enclosing a button suggesting that it be made slightly bigger with a shadow. Each of the annotations is a graphic and is represented as data in a graphic format such as JPEG or the like. Each of the annotations 214(1)(1), 214(1)(2), and 214(1)(3) is also placed in a location with respect to its respective artboard.

Second, the contextual notes 220, i.e., notes 220(1), 220(2), 220(3), each correspond to respective annotations 214(1)(1), 214(1)(2), and 214(1)(3). The contextual notes 220 are displayed on one side of the GUI 200 and contain textual references to the respective annotations. In some implementations, the textual references are generated from performing an optical character recognition operation on the respective annotations 214(1)(1), 214(1)(2), and 214(1)(3). In some implementations, the textual references are labels input by the designer, e.g., "font change" in note 220(1) corresponding to annotation 214(1)(1). In some implementations, each contextual note 220(1), 220(2), 220(3) performs an operation in response to detecting a user action, e.g., a mouse click, within its boundaries. For example, the action can involve highlighting the respective annotation, e.g, clicking on note 220(1) highlights annotation 214(1)(1).

The timeline 230 is a graphical representation of the hierarchal relationship between snapshot iterations and thus the history of the development of the content being designed. As illustrated in FIG. 2B, the timeline is represented by circles and lines. Each circle represents a snapshot and successive iterations evolve from left to right, i.e., children are to the right of parents. Each line represents a link between successive snapshots. A filled-in circle is displayed, while an empty circle is not. Accordingly, the middle, filled circle represents the snapshot 210(1) and the rightmost, filled circle represents the snapshot 210(2). Moreover, a snapshot that is a parent to the snapshot 210(1) is not displayed in the GUI 260. In some implementations, the appearance of a snapshot iteration can be toggled by clicking on the circle representing that snapshot.

The annotation toolbox 240 is configured to display annotation tools configured to generate annotation graphics. Examples of such annotation tools include a text box, a pen, a highlighter, a box tool, and a circle tool.

The current snapshot artboard list 250 is a graphic list of artboards shown in the GUI 260 for the current snapshot 210(1). In some implementations, each element of the list 250 is a thumbnail graphic representing a respective artboard. In some implementations, each element of the list 250 is a textual reference to a respective artboard for the current snapshot 210(1). In some implementations, each element of the list 250 may perform an action upon detecting a user action, e.g., a mouse click within its boundaries. An example of such an action is highlighting the artboard that was clicked in the list 250.

Figure 3:
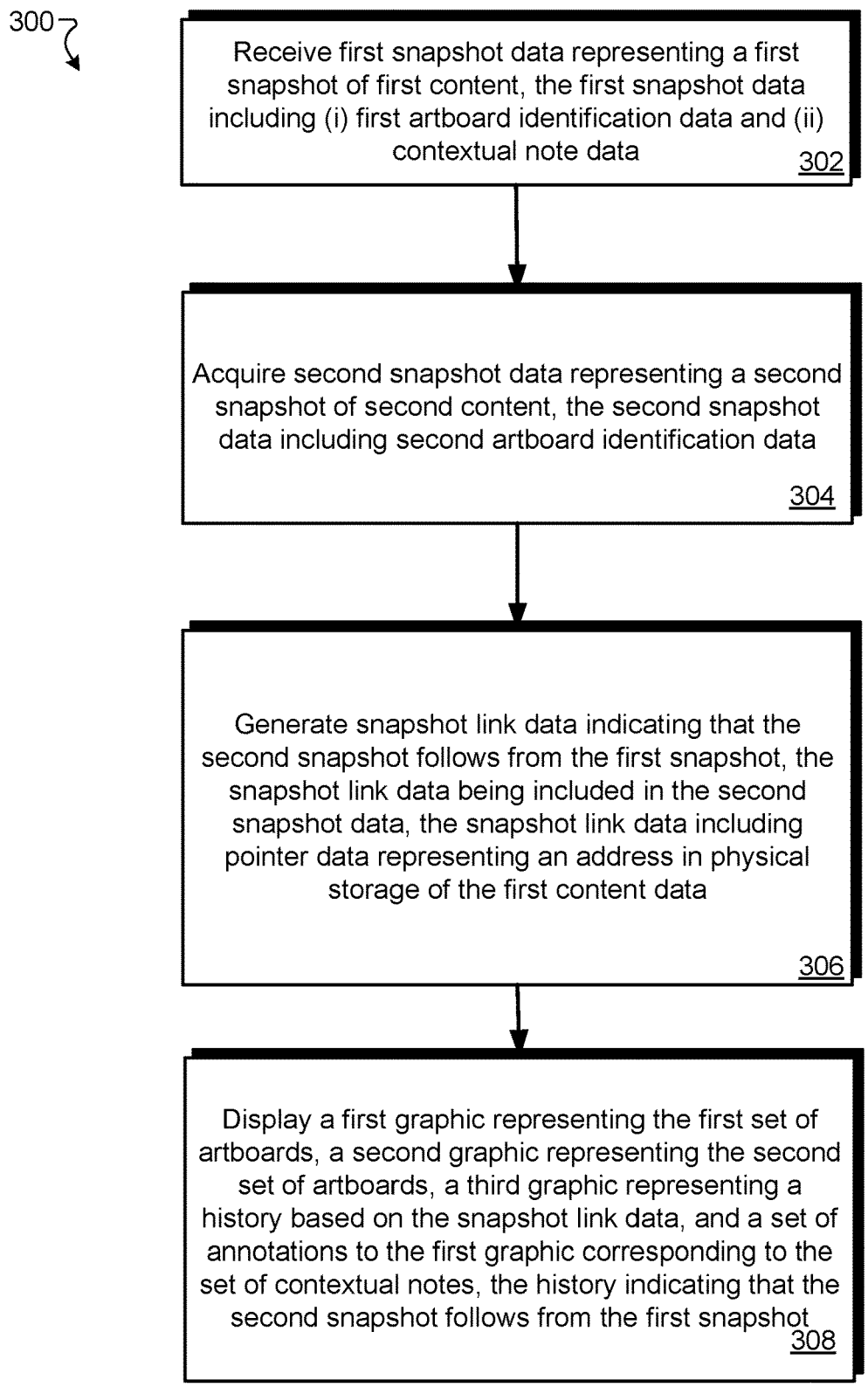
FIG. 3 is a flow chart that illustrates an example method of implementing the improved techniques as shown in the electronic environment in FIG. 1.

FIG. 3 is a flow chart depicting an example method 300 of managing design iterations. The method 300 may be performed by software constructs described in connection with FIG. 1, which reside in memory 126 of the computer 120 and are run by the set of processing units 124.

At 302, the snapshot data acquisition manager 130 (FIG. 1) receives first snapshot data, e.g., snapshot data 132 representing a first snapshot of first content, e.g., content data 162. The first snapshot data includes first artboard identification data, e.g., artboard identification data 134 identifying a first set of artboards, e.g., artboard data 160, each of the first set of artboards including portions of the first content. The first snapshot data also includes contextual note data, e.g., contextual note link data 136 representing a set of contextual notes, e.g., contextual note data 152, the set of contextual notes representing comments concerning the first set of artboards.

At 304, the snapshot data acquisition manager 130 acquires second snapshot data representing a second snapshot of second content. The second snapshot data includes second artboard identification data identifying a second set of artboards. Each of the second set of artboards includes sections of the second content. In some implementations, the second snapshot data is generated based on the contextual note data, i.e., the feedback given to the first set of artboards. In some implementations, the second content is received in a session synchronous with the contextual note data, i.e., when the feedback is being given by the stakeholder.

At 306, the snapshot link manager 140 generates snapshot link data, e.g., snapshot link data 142, indicating that the second snapshot follows from the first snapshot. The snapshot link data is included in the second snapshot data. The snapshot link data includes pointer data, e.g., pointer data 144, representing an address in physical storage of the first content data.

At 308, the graphic rendering manager 180 displays, on a display device, a first graphic, e.g., snapshot 210(1), representing the first set of artboards, a second graphic, e.g., snapshot 210(2), representing the second set of artboards, a third graphic, e.g., timeline 230, representing a history based on the snapshot link data, and a set of annotations, e.g., annotations 241(1)(1-3), to the first graphic corresponding to the set of contextual notes. The history indicates that the second snapshot follows from the first snapshot.

Figure 4A:
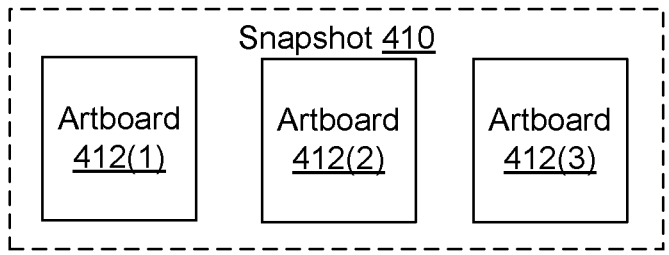
FIGS. 4A-4C are diagrams illustrating an example generation of links between iterations of snapshots.

FIG. 4A is a diagram illustrating an example snapshot 410. The snapshot 410 is shown in FIG. 4A as it might be represented on a display device, e.g., display device 190 as in FIG. 2. As shown in FIG. 4A, the snapshot 410 includes a set of artboards 412(1), 412(2), and 412(3). These artboards 412(1), 412(2), and 412(3) are part of a particular iteration of the snapshot 410. Subsequent FIGS. 4B and 4C illustrate how a link between the snapshot 410 and a child snapshot is generated from copy/paste operations.

Figure 4B:
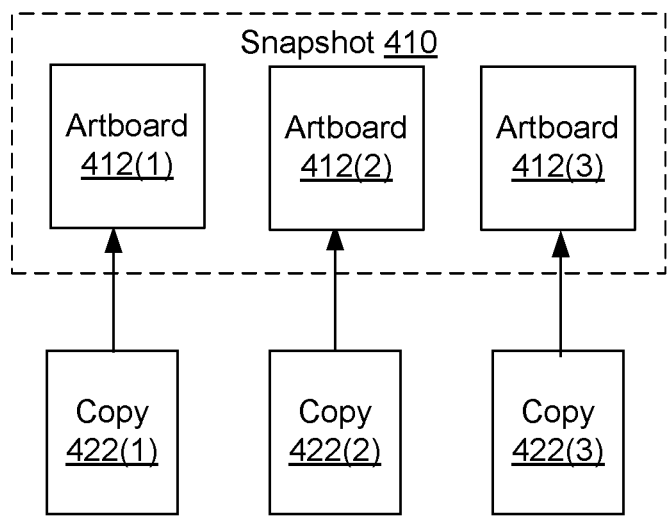

FIG. 4B is a diagram illustrating the example snapshot 410 and artboards 412(1), 412(2), and 412(3). In addition, FIG. 4B illustrates a set of respective copies 422(1), 422(2), and 422(3) of the artboards 412(1), 412(2), and 412(3). A designer may generate such copies as a start to generating a child snapshot.

When the designer generates the copies 422(1), 422(2), and 422(3), the snapshot link manager 140 duplicates the artboard identifiers corresponding to each of the artboards 412(1), 412(2), and 412(3) as metadata for each respective copy 422(1), 422(2), and 422(3). In some implementations, this metadata is an expression of a linked list from the copies, i.e., child artboards to the parent artboards. This metadata is represented as the arrows from copies 422(1), 422(2), and 422(3) to parent artboards 422(1), 422(2), and 422(3).

Figure 4C:
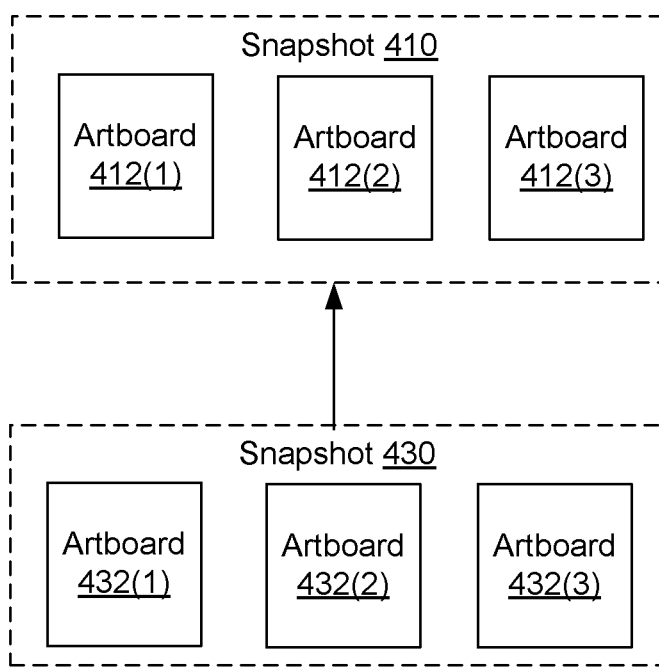

FIG. 4C is a diagram illustrating the example snapshot 410 and a new child snapshot 430 formed from artboards 432(1), 432(2), and 432(3). The artboards 432(1), 432(2), and 432(3) are derived from changes made to the copies 422(1), 422(2), and 422(3). The hierarchal relationship between parent snapshot 410 and child snapshot 430 is established based on the metadata generated from the copies. For example, in some implementations, the snapshot link manager 140 traverses the linked list of each child artboard 432(1), 432(2), and 432(3) back to its respective parent artboards 412(1), 412(2), and 412(3). In the case illustrated in FIGS. 4B and 4C, each traversal leads back to the artboards 412(1), 412(2), and 412(3) corresponding to the parent snapshot 410. In this way, the snapshot link manager 140 may generate a link between the child snapshot 430 and the parent snapshot 410.

In generating this link between the snapshots, none of the metadata for each copy 422(1), 422(2), and 422(3) is used in generating the timeline, e.g., timeline 230 in FIG. 2. Rather, it is the links between the snapshots are represented in the GUI 200.

FIGS. 4A-4C illustrate a relatively simple case in which there is a one-to-one relationship between child artboards and parent artboards. Nevertheless, there are many situations in which a designer may generate multiple snapshots for different shareholders, e.g., a client and a manager. In such situations, generating snapshot link data can be somewhat more complicated than illustrated in FIG. 4A-4C.

Figure 5A:
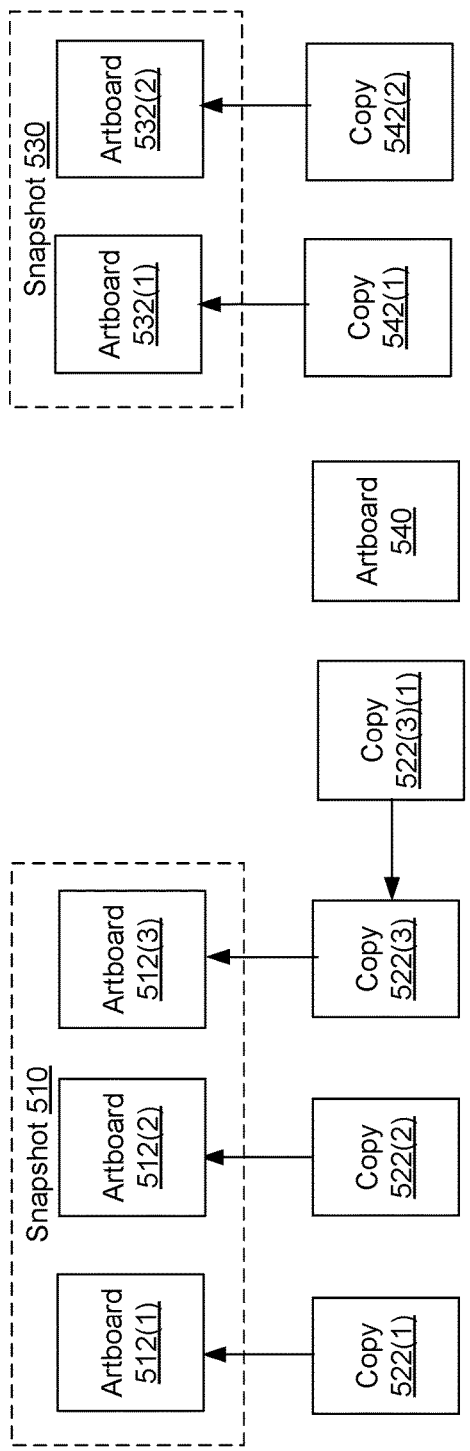
FIGS. 5A and 5B are diagrams illustrating another example generation of links between iterations of snapshots.

FIG. 5A is a diagram illustrating an example set of snapshots 510 and 530. The snapshot 510, as illustrated in FIG. 5A, corresponds to artboards 512(1), 512(2), and 512(3). The snapshot 530 corresponds to artboards 532(1) and 532(2). As in FIG. 4B, a designer performs a copy operation on each of these artboards as part of a design iteration and generates respective copies 522(1), 522(2), and 522(3); and 542(1) and 542(2). As described above, the snapshot link manager 140 generates metadata, i.e., based on linked lists, that represent links between the copies and the parent artboards.

Additionally, the designer has made a copy 522(3)(1) of the copy 522(3) and has also created a new artboard 540 not linked to any of the artboards corresponding to the snapshots 510 and 530. An example scenario in which such copies and artboards would be created is a case in which the designer wishes to try out different designs in the same iteration, each for different shareholders. In this case, there is metadata representing a hierarchal relationship between the parent artboard 522(3) and the copy 522(3)(1).

Figure 5B:
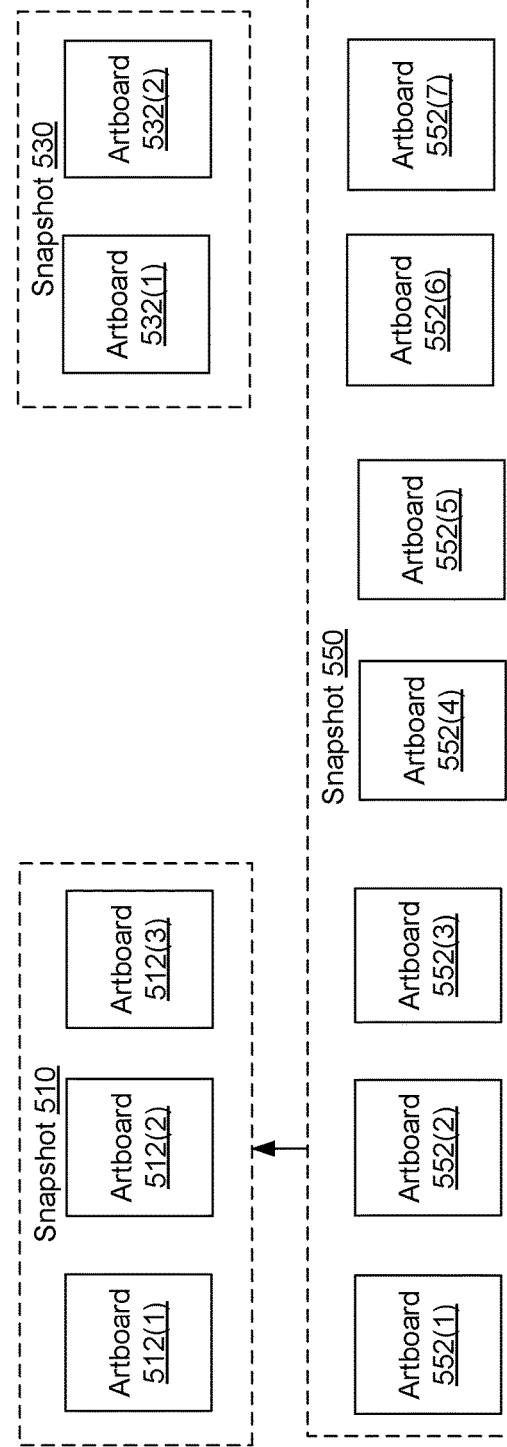

FIG. 5B is a diagram illustrating the example snapshots 510 and 530 and a new snapshot 550 based on the copies 522(1), 522(2), and 522(3), the copy 522(3)(1), the artboard 540, and the copies 542(1) and 542(2). It is assumed here that the designer has edited these copies and snapshot 540 to generate artboards 552(1-7) and has selected all of these artboards to be included in snapshot 550. In the case where a child can have only one parent, the snapshot link manager 140 is configured to automatically determine the unique parent snapshot of child snapshot 550.

In this case, the snapshot link manager 140 determines the parent by counting which of the snapshots 510 and 530 have more artboards linked back to those snapshots. For example, the snapshot 510 has links to four artboards: 552(1), 552(2), 552(3), and 552(4), because artboard 552(4), based on copy 522(3)(1), is linked to artboard 552(3), which in turn is linked to artboard 512(3) corresponding to snapshot 510. Under the same reasoning, the snapshot 530 has links to two artboards: 552(6) and 552(7), because artboard 552(5), based on artboard 540, is not linked to any parent artboard. In this case, the snapshot link manager 140 assigns the parent link to snapshot 510, as illustrated in FIG. 5B. In more complex situations involving hundreds or thousands of artboards, such a snapshot hierarchy as illustrated here may be determined using a hash table.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
receiving, by processing circuitry of a computer configured to store and display iterations of content data, first snapshot data representing a first snapshot of first content, the first snapshot data including (i) first artboard identification data including one or more addresses identifying a first set of artboards, each of the first set of artboards including an iteration of portions of the first content comprising one or more of graphic data and audio data and (ii) contextual note data representing a set of contextual notes, the set of contextual notes representing comments concerning the first set of artboards;
acquiring, by the processing circuitry, second snapshot data representing a second snapshot of second content, the second snapshot data including second artboard identification data including one or more addresses identifying a second set of artboards, each of the second set of artboards including an iteration of portions of the second content based at least in part on the first snapshot data;

generating, by the processing circuitry, snapshot link data indicating that the second snapshot follows from the first snapshot, the snapshot link data being included in the second snapshot data, the snapshot link data including pointer data representing an address in physical storage of the first content; and displaying, by the processing circuitry and on a display device, a first graphic representing the first set of artboards, a second graphic representing the second set of artboards, a third graphic representing a history based on the snapshot link data, and a set of annotations to the first graphic corresponding to the set of contextual notes, the history indicating that the second snapshot follows from the first snapshot.

2. The method as in claim 1, further comprising:
displaying, on the display device, a fourth graphic that includes a textual representation of the contextual note data.

3. The method as in claim 2, further comprising:
receiving data indicating a selection of a textual representation of a contextual note of the set of contextual notes; and
performing a highlighting operation on the set of annotations to highlight the annotation corresponding to the contextual note relative to other annotations of the set of annotations.

4. The method as in claim 1, wherein receiving the first content data and the contextual note data includes:
generating a first content data file;
generating a contextual note data file separate from the first content data file; and
generating, as the contextual note data of the first snapshot data, contextual note link data including pointer data representing an address in physical storage of the contextual note data file.

5. The method as in claim 1, wherein generating the snapshot link data indicating that the second snapshot follows the first snapshot in time includes:
receiving copy/paste data representing a history and copy commands and paste commands within the application window; and
producing the snapshot link data based on the copy/paste data.

6. The method as in claim 1, further comprising:
receiving the second content data in a session synchronous with the receiving of the contextual note data.

7. The method as in claim 1, wherein generating the snapshot link data indicating that the second snapshot follows the first snapshot in time includes:
generating, as snapshot link data included in the first snapshot data, pointer data representing an address in physical storage of the second content data.

8. A computer program product comprising a nontransitory storage medium, the computer program product including code that, when executed by processing circuitry of a computer configured to store and display iterations of content data, causes the processing circuitry to perform a method, the method comprising:
first snapshot data representing a first snapshot of first content, the first snapshot data including (i) first artboard identification data including one or more addresses identifying a first set of artboards, each of the first set of artboards including an iteration of portions of the first content comprising one or more of graphic data and audio data and (ii) contextual note data representing a set of contextual notes, the set of contextual notes representing comments concerning the first set of artboards;

acquiring second snapshot data representing a second snapshot of second content, the second snapshot data including second artboard identification data including one or more addresses identifying a second set of artboards, each of the second set of artboards including an iteration of portions of the second content based at least in part on the first snapshot data;

generating snapshot link data indicating that the second snapshot follows from the first snapshot, the snapshot link data being included in the second snapshot data, the snapshot link data including pointer data representing an address in physical storage of the first content data; and displaying, on a display device, a first graphic representing the first set of artboards, a second graphic representing the second set of artboards, and a third graphic representing a history based on the snapshot link data, the history indicating that the second snapshot follows from the first snapshot.

9. The computer program product as in claim 8, wherein receiving the first snapshot data includes:
obtaining artboard selection data selecting at least one artboard from an initial set of artboards; and
identifying, as the set of artboards selected by the first snapshot, the at least one artboard selected by the artboard identification data.

10. The computer program product as in claim 9, wherein the initial set of artboards is stored as a database file in a database, and
wherein obtaining the artboard selection data selecting at least one artboard from an initial set of artboards includes:
receiving a database query identifying portions of the database file that includes the at least one artboard.

11. The computer program product as in claim 10, wherein the database is a NoSQL database.

12. The computer program product as in claim 9, wherein the method further comprises:
receiving contextual note data representing a set of contextual notes, the set of contextual notes corresponding to the first set of artboards identified by the first snapshot identification data and representing comments concerning the first set of artboards; and
displaying, on the display device within the application window, a set of annotations to the first graphic corresponding to the set of contextual notes.

13. The computer program product as in claim 9, further comprising:
displaying, on the display device, a fourth graphic that includes a textual representation of the contextual note data.

14. The computer program product as in claim 13, further comprising:
receiving data indicating a selection of a textual representation of a contextual note of the set of contextual notes; and
performing a highlighting operation on the set of annotations to highlight the annotation corresponding to the contextual note relative to other annotations of the set of annotations.

15. The computer program product as in claim 9, further comprising:
receiving the second snapshot data in a session synchronous with the receiving of the contextual note data.

16. An electronic apparatus configured to store and display iterations of content data, the electronic apparatus comprising:
a network interface;
a memory; and
controlling circuitry coupled to the memory, the controlling circuitry being configured to:
receive first snapshot data representing a first snapshot of first content, the first snapshot data including (i) first artboard identification data including one or more addresses identifying a first set of artboards, each of the first set of artboards including an iteration of portions of the first content comprising one or more of graphic data and audio data and (ii) contextual note data representing a set of contextual notes, the set of contextual notes representing comments concerning the first set of artboards;
acquire second snapshot data representing a second snapshot of second content, the second snapshot including second artboard identification data including one or more addresses identifying a second set of artboards, each of the second set of artboards including an iteration of portions of the second content based at least in part on the first snapshot data;
generate snapshot link data indicating that the second snapshot follows from the first snapshot, the snapshot link data being included in the second snapshot data, the snapshot link data including pointer data representing an address in physical storage of the first content data; and
display, on a display device, a first graphic representing the first set of artboards, a second graphic representing the second set of artboards, a third graphic representing a history based on the snapshot link data, and a set of annotations to the first graphic corresponding to the set of contextual notes, the history indicating that the second snapshot follows from the first snapshot.

17. The electronic apparatus as in claim 16, wherein the controlling circuitry configured to receive the first content data is further configured to:
obtain artboard selection data selecting at least one artboard from an initial set of artboards; and
identify, as the set of artboards selected by the first snapshot, the at least one artboard selected by the artboard identification data.

18. The electronic apparatus as in claim 17, wherein the initial set of artboards is stored as a database file in a database, and
wherein the controlling circuitry configured to obtain the artboard selection data selecting at least one artboard from an initial set of artboards is further configured to:
receive a database query identifying portions of the database file that includes the at least one artboard.

19. The electronic apparatus as in claim 16, wherein the controlling circuitry configured to display the first graphic, the second graphic, the third graphic, and the set of annotations is further configured to:
display, in a first application window, the first graphic and the second graphic; and
display, in a second application window different from the first application window, the first graphic, the third graphic, and the set of annotations.

* * * * *